United States Patent [19]

Makino

[11] Patent Number: 5,612,879
[45] Date of Patent: Mar. 18, 1997

[54] VEHICLE CONTROL UNIT FOR CONTROLLING A SPECIFIC TARGET BASED ON WHEEL SPEED

[75] Inventor: Nobuhiko Makino, Anjo, Japan

[73] Assignee: Niipondenso Co., Ltd., Kariya, Japan

[21] Appl. No.: 405,692

[22] Filed: Mar. 17, 1995

[30] Foreign Application Priority Data

Mar. 22, 1994 [JP] Japan .................................. 6-050300

[51] Int. Cl.$^6$ ...................................................... B60T 8/32
[52] U.S. Cl. ............ 364/426.01; 364/565; 364/424.034; 340/438; 303/168
[58] Field of Search ......................... 364/426.01, 426.02, 364/424.03, 565, 424.05; 340/438, 441; 303/168, 174

[56] References Cited

U.S. PATENT DOCUMENTS

| | | | |
|---|---|---|---|
| 4,504,911 | 3/1985 | Braschel et al. | 364/426 |
| 4,773,014 | 9/1988 | Hagiya et al. | 364/426.02 |
| 4,884,056 | 11/1989 | Ishizeki | 340/453 |
| 4,969,696 | 11/1990 | Yogo et al. | 303/109 |
| 4,989,923 | 2/1991 | Lee et al. | 303/109 |
| 5,246,279 | 9/1993 | Onaka et al. | 303/109 |
| 5,295,738 | 3/1994 | Matsuura et al. | 303/100 |
| 5,473,225 | 1/1995 | Miyazaki | 318/52 |

FOREIGN PATENT DOCUMENTS 5-294226  11/1993  Japan.

*Primary Examiner*—Michael Zanelli
*Attorney, Agent, or Firm*—Cushman, Darby & Cushman IP Group of Pillsbury Madison & Sutro LLP

[57] ABSTRACT

A vehicle control unit stores a minimum calculable speed of a wheel speed. The minimum calculable speed is a wheel speed first calculated by ECU based on output signals of speed sensors after the vehicle starts traveling. The minimum calculable speed is compared with a predetermined speed value as a permissible speed. The permissible speed is a reference value for determining whether the vehicle control is to be executed or not. If the minimum calculable speed is higher than the predetermined speed value, the minimum calculable speed is set as the permissible speed. A calculated vehicle body speed or a calculated wheel speed is compared with the permissible speed. If the vehicle body speed or the wheel speed is higher than the permissible speed, the vehicle control is executed normally, estimating the calculated vehicle body speed or the calculated wheel speed being correct. Therefore, the vehicle control unit can accurately control a specific control target even during low speed travel.

18 Claims, 6 Drawing Sheets

VEHICLE CONTROL UNIT FOR CONTROLLING A SPECIFIC TARGET BASED ON WHEEL SPEED

CROSS REFERENCE TO RELATED APPLICATION

This application is based upon and claims priority of Japanese Patent Application No. 6-50300 filed Mar. 22, 1994, the content of which is incorporated herein by reference.

BACKGROUND OF THE INVENTION

1. Field of the Invention

The present invention relates to a vehicle control unit for controlling a specific control target such as a braking device on a vehicle based on wheel speed. More particularly, the present invention relates to a control unit for controlling a specific control target adequately, even if the sensed wheel speed is not accurate because of limitations of a speed sensor, for instance.

2. Related Art

It is known that a vehicle control unit controls a specific control target such as a braking device on a vehicle on the basis of wheel speed sensed by a speed sensor. For example, an anti-skid control unit controls the braking force to each wheel on the basis of the wheel speed. The wheel speed is usually calculated from the frequency signal corresponding to the wheel rotation, which the speed sensor outputs. It is, however, difficult to calculate the accurate wheel speed when the wheel rotation is below a specific speed. This results from the fact that the frequency signal is not output correctly or is noisy, because the period of the frequency signal becomes long. Therefore, the vehicle control unit can make an undesired control when the wheel speed lowers below the specific speed.

To solve the above problem, it was proposed that the vehicle control unit controls braking only when the sensed wheel speed is more than a predetermined speed. When the sensed speed drops below the predetermined speed, the control unit stops or changes the control mode, determining that the sensed speed can not be used to control the specific control target adequately. However, there is also a possibility that the wheel speed can not be sensed adequately because of occurrence of fault in the speed sensor, even if the wheel speed is more than the predetermined speed. In this case, the vehicle control target can not be controlled adequately, because the vehicle control unit controls the vehicle control target on the basis of the incorrect wheel speed.

SUMMARY OF THE INVENTION

The present invention thus has an object of controlling a specific control target such as braking force adequately, even if the wheel speed is not calculated accurately because of trouble, for instance, with a speed sensor, when the wheel speed is more than a specific speed.

The object is attained by storing a minimum calculable speed of the wheel speed and changing the vehicle control mode according to whether a calculated wheel speed is more than the minimum calculable speed or not. The wheel speed calculated for the first time after the vehicle starts traveling is stored as the minimum calculable speed. Whenever the calculated wheel speed is more than the minimum calculable speed, the wheel speed can be estimated to be a correct speed. The calculated wheel speed is not considered correct when the calculated wheel speed is below the minimum calculable speed. Therefore, the vehicle control unit can control the vehicle control target adequately by changing control mode according to whether the calculated wheel speed is more than the minimum calculable speed or not.

The wheel speed calculated for the first time is compared with a predetermined speed. The predetermined speed is set up as the minimum calculable speed, if the wheel speed calculated for the first time is below the predetermined speed. The vehicle control unit can prevent the wheel speed calculated incorrectly from being stored as the minimum calculable speed.

BRIEF DESCRIPTION OF THE DRAWINGS

Other features and advantages of the present invention will be appreciated, as well as methods of operation and the function of the related parts, from a study of the following detailed description, the appended claims, and the drawings, all of which form a part of this application. In the drawings:

DETAILED DESCRIPTION OF THE PREFERRED EMBODIMENTS

Figure 1:
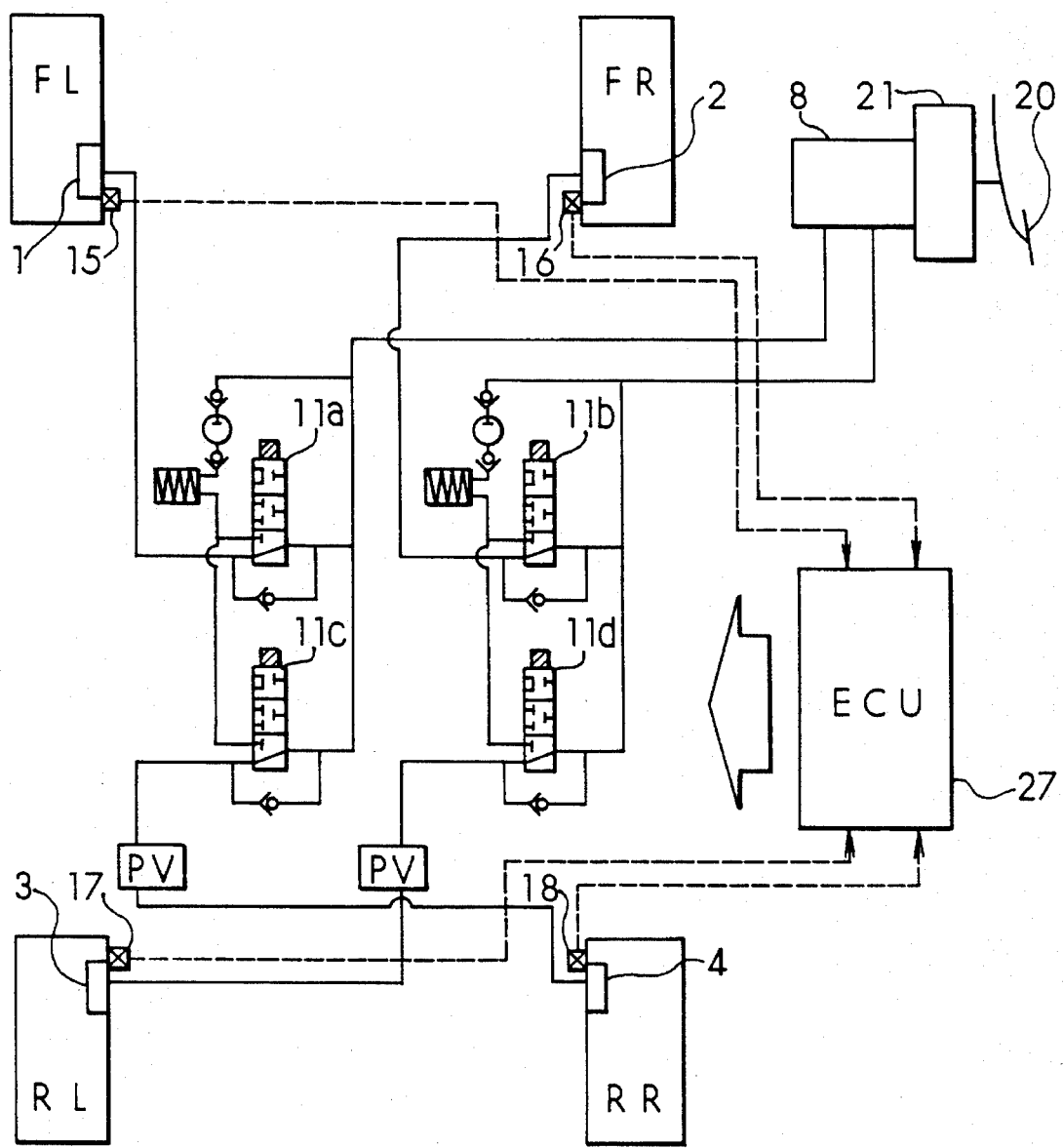
FIG. 1 is a configuration view illustrating the configuration of the embodiment according to the present invention.

Before explaining the embodiment according to the present invention, the outline of this invention will be described.

This invention relates to a vehicle control unit that controls a specific control target on a vehicle based on at least the wheel speed. The vehicle control units of this invention include the anti-skid control unit (ABS), traction control unit (TRC), rear wheel steering unit (4WS) and so on. When controlling the applicable control targets based on the wheel speed, the control must be performed only based on the accurately computed wheel speed. Otherwise, it cannot be anticipated that the specific control target will be controlled adequately. In particular, during low speed travel of the vehicle the wheel speed sensor can not output a correct output signal. In that case, it is difficult to perform accurate control for the specific control target.

Conventionally when the calculated wheel speed dropped below a predetermined speed, the vehicle control unit stops control based on the wheel speed. However, in a wheel speed sensor such as a magnetic pickup, which outputs a frequency signal according to the wheel rotation speed, the gap between the magnetic coil and rotor formed with a specified number of teeth widens abnormally due to slack, looseness and deformation, etc., of the sensor itself or the installation portion onto the vehicle. In this case, the minimum calculable speed based on the frequency signal may rise above the predetermined speed. Because of this, undesirable control may be performed even when the wheel speed is above the predetermined speed.

In the present invention, the minimum calculable speed is detected and stored based on the frequency signals from the wheel speed sensor. If the wheel speed is lower than this minimum calculable speed, the control based on the wheel speed is stopped and/or changed to that based on other parameters.

However, if the present invention is applied to anti-skid control as explained in the first embodiment later, the above-mentioned theory of the present invention cannot be directly applied. This is because, during anti-skid control the wheel is slipping over the road, and due to this slip the calculated wheel speed may be lower than the minimum calculable speed. In this case, it is not appropriate to stop the anti-skid control (reduction of brake pressure) just because the wheel speed is too low. In the first embodiment, the concept of vehicle body speed is incorporated. The vehicle control unit determines whether the accurate wheel speed can not be calculated essentially or whether the wheel speed is below the minimum calculable speed because of slipping, on the basis of the vehicle body speed.

That is to say, if both the wheel speed and the vehicle body speed are higher than the minimum calculable speed, the wheel speed can be accurately computed. In those conditions, the anti-skid control is performed when the wheel slip is occurring. If the vehicle body speed is higher than the minimum calculable speed and the wheel speed is lower than the minimum calculable speed, the calculated wheel speed itself will not be completely accurate, but at least it can be predicted that wheel slip is occurring. When such conditions are established, the wheel brake pressure is reduced to make the wheel speed up. If the accurate wheel speed cannot be computed essentially, in other words, when both the wheel speed and the vehicle body speed are lower than the minimum calculable speed, reduction of the brake pressure is prohibited.

The present invention will be described in detail with reference to the embodiments.

FIG. 1 is a schematic diagram illustrating the entire configuration of the first embodiment. A brake pedal 20 is coupled to a master cylinder 8 via a vacuum booster 21. Thus, when the brake pedal 20 is pressed down, a fluid pressure is generated in the master cylinder 8, and this fluid pressure is supplied to wheel cylinders 1, 2, 3 and 4 installed on wheels, a front left wheel (FL), a front right wheel (FR), a rear left wheel (RL) and a right rear wheel (RR) respectively, so that the braking operation is executed. Magnetic pickup type wheel speed sensors 15, 16, 17 and 18 are installed on the above wheels, so that the wheel speed signals used for computing the respective wheel speeds are produced. These wheel speed signals are input to an electronic control unit (hereafter "ECU") 27. ECU 27 computes the wheel speed of each wheel and the vehicle body speed, etc., based on each wheel speed signal that is input thereto.

Based on the wheel speeds and vehicle body speed, etc., ECU 27 also outputs a drive signal to solenoid valves 11a to 11d to control the brake pressure of each wheel cylinder 1 to 4. The anti-skid control unit in the embodiment has a configuration as explained above. The other details on the configuration which are not essential are the same as those disclosed in Japanese Unexamined Patent Publication No. 5-294226, and thus the explanation thereof will be omitted here for brevity.

The operation theory of the embodiment configured as explained above will be explained based on FIG. 2.

Figure 2:
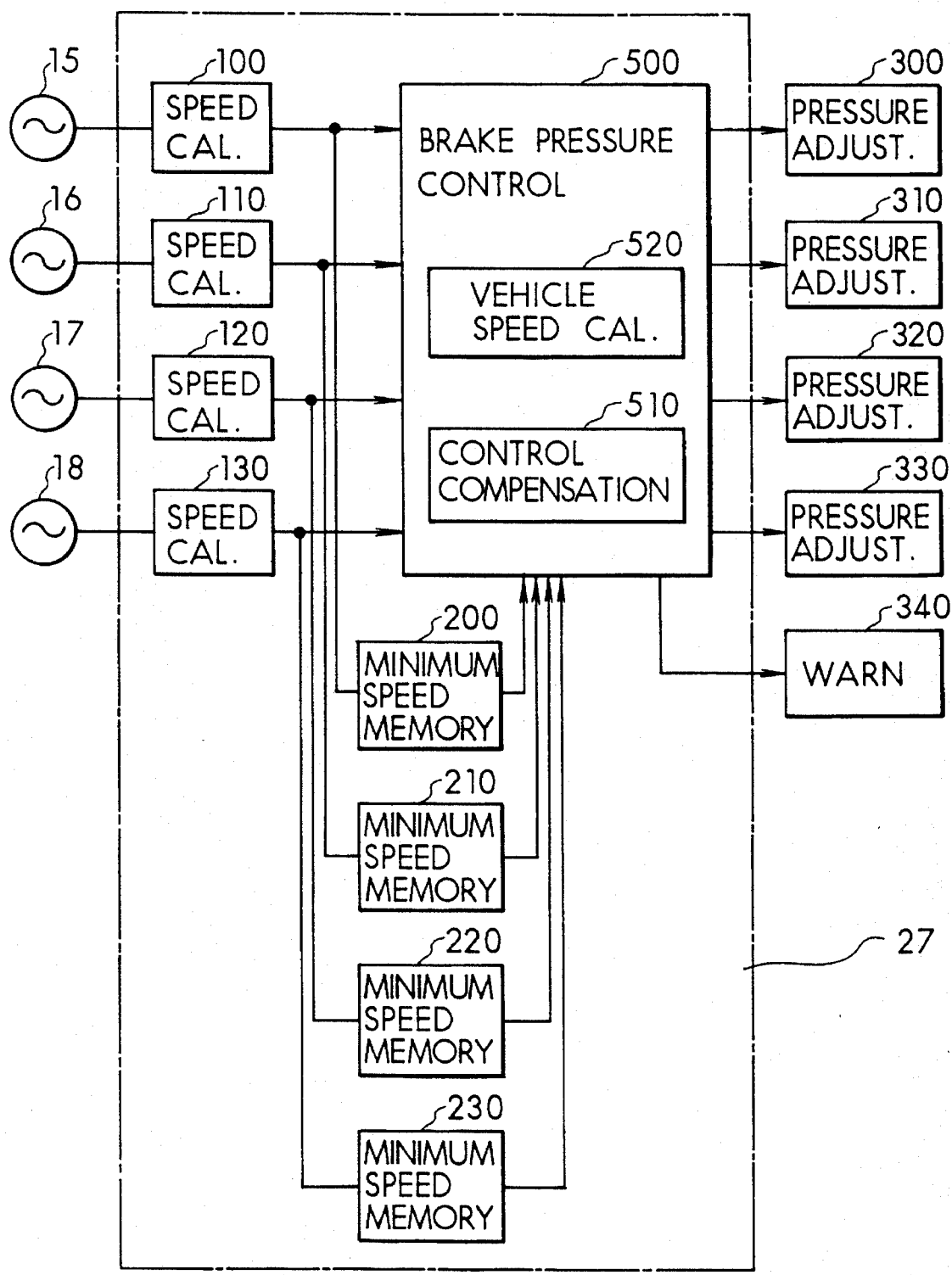
FIG. 2 is a view illustrating the block configuration of the embodiment according to the present invention.

FIG. 2 is a block diagram illustrating the configuration of the first embodiment. The wheel speed signals output from the wheel speed sensors 15 to 18 are input to each wheel speed calculation means 100 to 130 arranged in the ECU 27. Each wheel speed computed at these wheel speed calculation means 100 to 130 is input to brake pressure control means 500 and each minimum calculable speed memorization means 200 to 230 arranged in the ECU 27. The minimum calculable speed value of each wheel speed is detected at each minimum calculable speed memory 200 to 230, and each value is stored. The preset permissible speed and minimum calculable speed value of each wheel speed are compared at the control condition compensation means 510 provided in the brake pressure control means 500. If each wheel speed's minimum calculable speed value is lower than the permissible speed, the permissible speed is used as a standard value whether to execute the anti-skid control or whether to change the control mode. If a wheel speed value higher than the permissible speed is computed as the wheel speed's minimum calculable speed value, the minimum calculable speed value is set as the permissible speed. When the brake pressure control means 500 determines on the (compensated) permissible speed, whether to execute the control or not, the brake pressure control means 500 drives the brake pressure adjustment means 300 to 330 for each wheel. In more detail, each minimum calculable speed value at each wheel is compared with the permissible speed. The vehicle body speed computed based on the wheel speeds by body speed computation means 520 is also compared with the permissible speed at the control condition compensation means 510. If the vehicle body speed is higher than the permissible speed, the brake pressure control according to anti-skid control is executed. If the vehicle body speed is lower than the permissible speed, the brake pressure control is prohibited. In this prohibition condition, for example, after the brake pressure is increased, it is kept unchanged. If each minimum calculable speed value at each wheel is detected to be a value higher than the permissible speed, the permissible speed for that wheel is compensated and changed to the minimum calculable speed value. By comparing the compensated and changed permissible speed and the vehicle body speed, the brake pressure is controlled in the same manner as explained above. The brake control pressure means 500 notifies a malfunction of, for instance, speed sensor to vehicular occupant by driving a warning means 340, when the minimum calculable speed value of a specific wheel exceeds the permissible speed more than a predetermined number of times. The predetermined number of times include a value lower than one time. In this case, when the minimum calculable speed exceeds the permissible speed once, the warning is given to the vehicular occupant.

Figure 3:
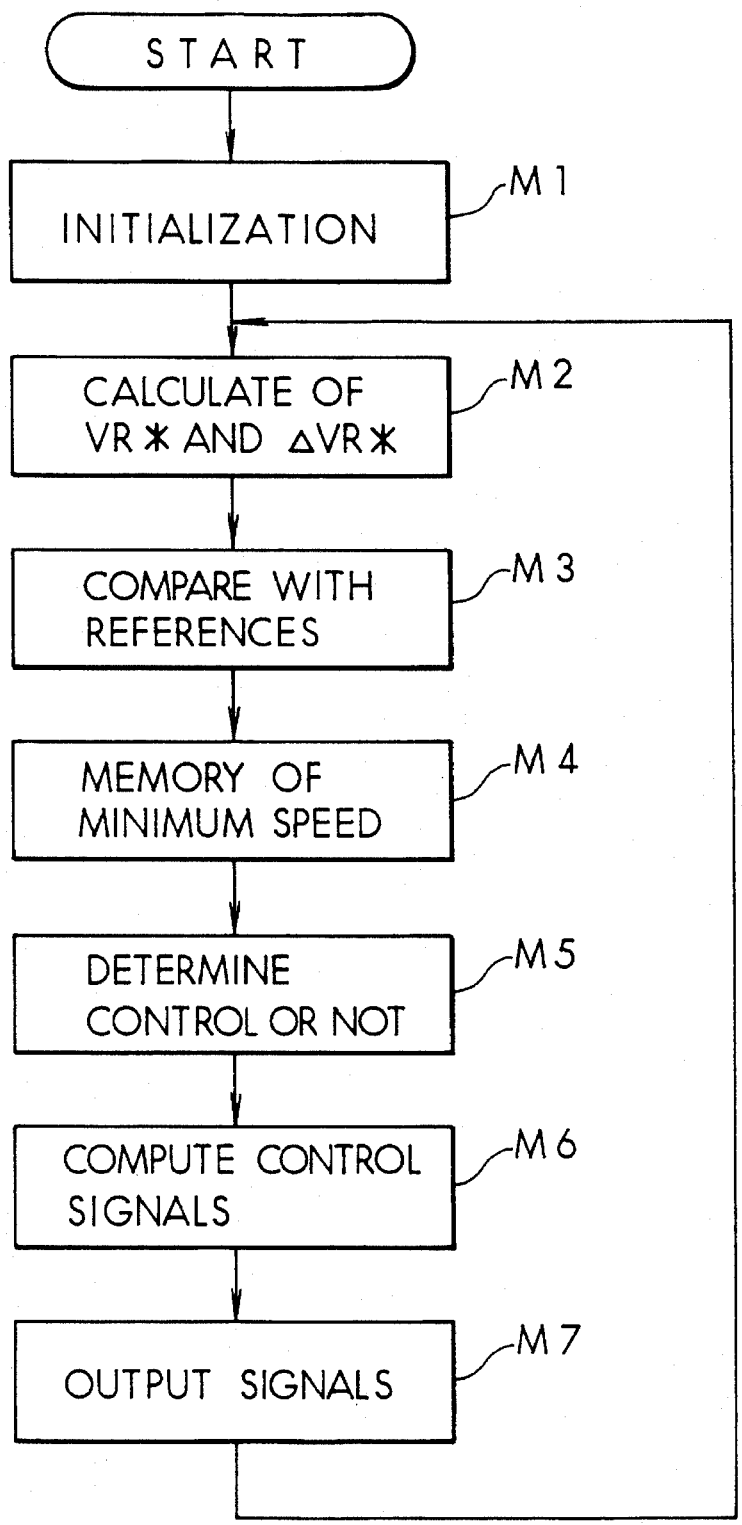
FIG. 3 is a flow chart illustrating the main routine of processing in the vehicle control unit ECU of the embodiment according to the present invention.
Figure 4:
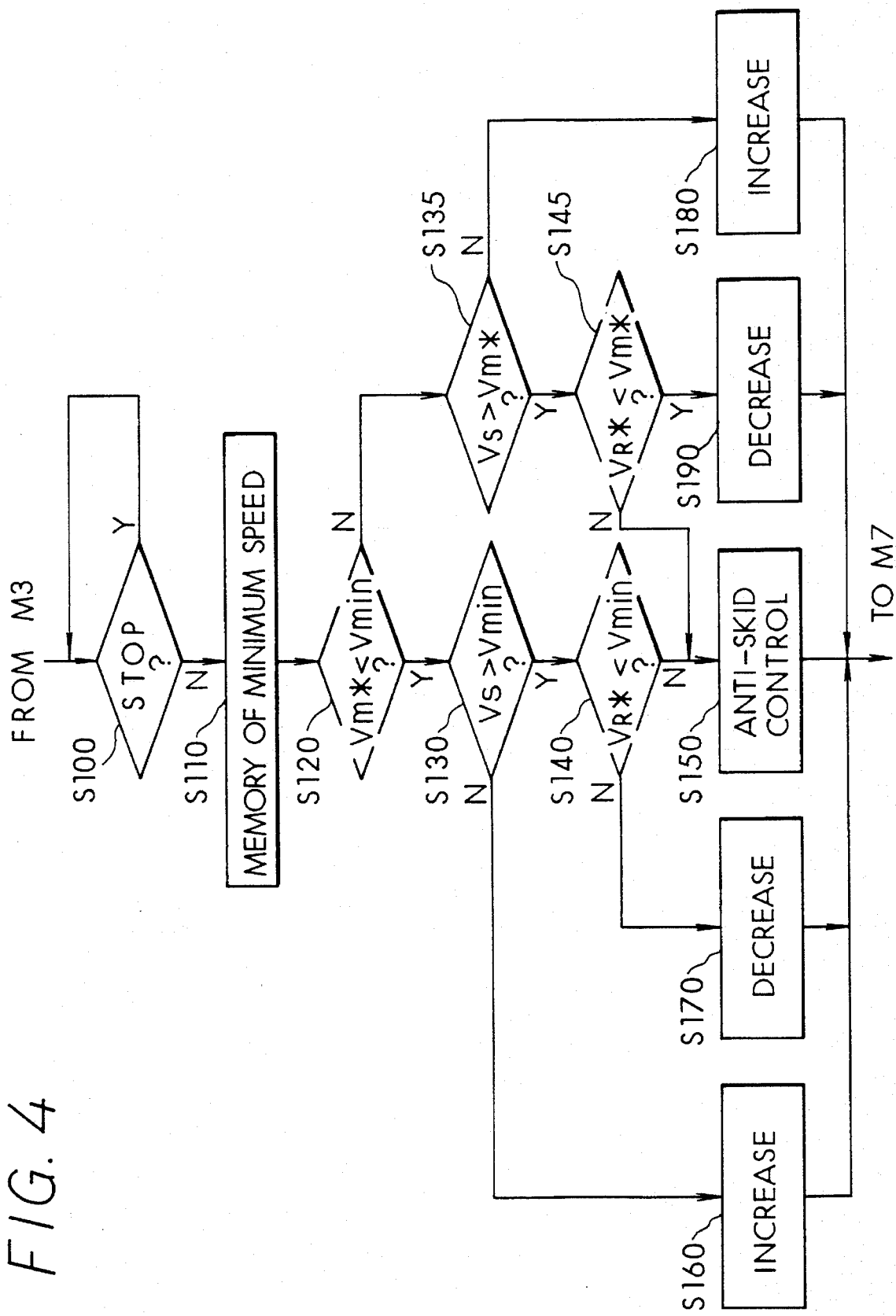
FIG. 4 is a flow chart illustrating the processing executed near the minimum speed range of the vehicle.
Figure 5:
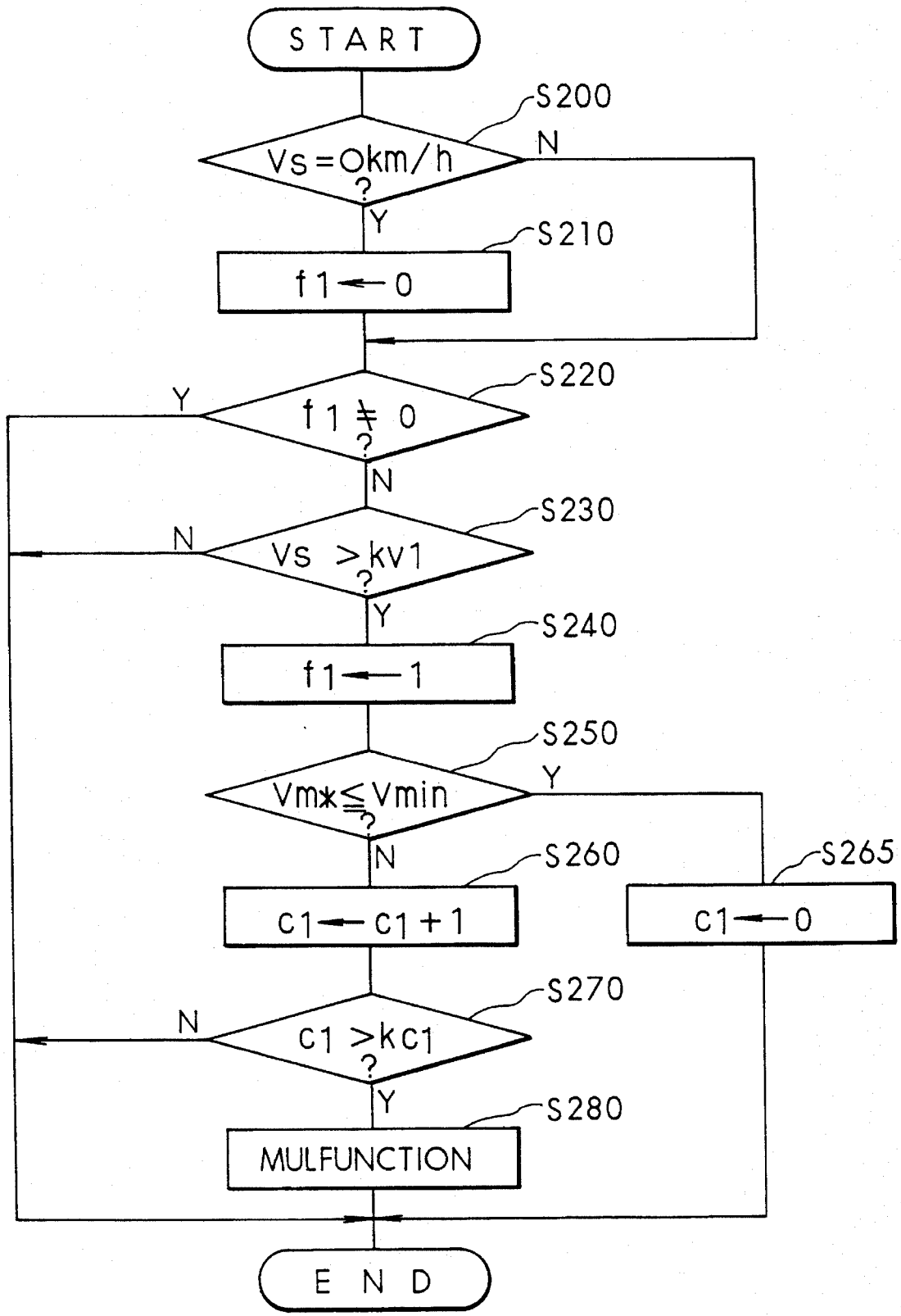
FIG. 5 is a flow chart for issuing warnings to the vehicular occupant.

FIGS. 3 to 5 are flow charts that illustrate the computation process executed by ECU 27.

FIG. 3 is a flow chart illustrating the main routine performed in ECU 27. The computation process starts after the ignition switch (not illustrated) is turned on. After initialization of each flag, etc., is done in step M1, wheel speeds VR* and wheel accelerations ΔVR* are calculated in step M2 based on the wheel speed signals output from wheel speed sensors 15, 16, 17 and 18. The suffix "*" here indicates the left, right, front, rear wheels. In the following explanations, "1" will be used to express the FR wheel, "2" the FL wheel, "3" the RR wheel and "4" the RL wheel. In step M3, wheel speeds VR* and wheel accelerations ΔVR* are compared with specified reference speeds and reference accelerations to determine whether the wheels may lock or whether the wheel slip rate of each wheel has increased.

In step M4, a minimum calculable speed value is detected and stored for each wheel based on the wheel speeds VR* calculated in step M2. In step M5, a permissible speed which is a reference value for determining whether to execute the anti-skid control is set based on the minimum calculable speed value, and determination is made whether to execute brake pressure control according to the anti-skid control, based on this permissible speed.

In step M6, the brake pressure control signals are computed based on the determination in step M5. In other words, if the execution of brake pressure control according to anti-skid control is determined in step M5, the control signals depending on the anti-skid control based on the wheel speed, wheel acceleration and vehicle body speed are computed. If the execution is not determined in step M5, the control signals increasing the brake pressure are not computed depending on the anti-skid control but based on the conditions such as wheel speed and vehicle body speed. In step M7, the brake pressure of the wheels are adjusted according to the control signals computed in step M6.

FIG. 4 is a flow chart illustrating the further control details of steps M4 to M6 shown in FIG. 3. When the process starts, it is determined at step S100 whether the vehicle is stopping or not. This determination is made whether the assumed body speed, calculated with the known assumed body speed computation method, is 0 km/h. Or this determination can also be made whether the maximum wheel speed value of each wheel is 0 km/h. If the vehicle is stopping, the following process is not executed. If the vehicle is traveling, the process moves on to step S110. The process can also include resetting the previously calculated minimum calculable speed value VM* when the vehicle stops.

In step S110, minimum wheel speeds detected by the wheel sensors installed on each wheel are detected and stored. The minimum calculable speed values Vm* are the wheel speeds VR* which the first computations are completed at each wheel after the vehicle starts traveling. Otherwise, after the initial wheel speed computations at each wheel are completed, the average values of several wheel speeds values VR* obtained in a specified time are computed. This average values can be used for the minimum calculable speed values VM* for each wheel.

In step S120, the minimum calculable speed values Vm* and preset permissible speed Vmin are compared. If the minimum calculable speed values Vm* are lower than the permissible speed Vmin, the process moves on to step S130. At step S130, a determination is made about whether the current vehicle body speed VS is higher than the permissible speed Vmin. If the current vehicle body speed VS is higher than the permissible speed Vmin, the process moves on to step S140. At step S140, a determination is made about whether the current wheels speeds VR* at each wheel are lower than the permissible speed Vmin. If it is determined that the wheel speeds VR* are higher than the permissible speed Vmin, the process moves on to step S150 and it is determined whether the execution of brake pressure control according to anti-skid control needs to be performed or not based on wheel slip conditions. If the anti-skid control is needed, the brake pressure control signals are computed on the wheel slip conditions. At step S150, the wheel slip conditions are detected from the relation of the vehicle body speed and wheel speeds with the same manner as the process for normal anti-skid control. The brake pressure control is then executed to improve the braking force to the vehicle based on the computed brake pressure control signals. If the anti-skid control is not needed, the vehicle is braked with the brake force given when the brake pedal is pressed down.

If it is determined that a wheel speed VR* is lower than the permissible speed Vmin, the brake pressure of the wheel is decreased according to the anti-skid control at step S170. In such condition, the wheel is at a low speed range in which the wheel speed VR* cannot be computed, but the vehicle body speed is higher than the permissible speed Vmin. Therefore, it is assumed that the wheel slip condition is above the specified slip ratio. Thus, to avoid this wheel slip condition, the brake pressure is decreased. If it is determined that the vehicle body speed is lower than the permissible speed Vmin at step S130, it is assumed that the vehicle body is in the low speed range just before stopping, and that a correct computation of the wheel speed is not possible. In this case, the brake pressure is increased at step S160, in order to prevent undesired pressure reduction by the anti-skid control and to increase the vehicle deceleration.

If it is determined that the minimum calculable speed value Vm* is higher than the permissible speed Vmin in step S120, the process moves on to step S135. At step S135, the permissible speed Vmin is raised to the minimum calculation speed value Vm* and the vehicle body speed VS is compared with the minimum calculable speed value Vm*. If the vehicle body speed VS is lower than the minimum calculable speed value Vm*, the process moves on to step S180.

At step S180, it is assumed that the vehicle body speed is low, and that an accurate computation of the wheel speed is not possible. Thus, to prevent undesired pressure reduction by the anti-skid control, the brake pressure control according to anti-skid control is prohibited, and the brake pressure is increased to increase the vehicle body deceleration in step S180. If the vehicle body speed is higher than the minimum calculable speed value Vm* in step S135, the process moves on to step S145 and the wheel speed VR* and the minimum calculable speed value Vm* are compared. If the wheel speed VR* is lower than the minimum calculable speed value Vm*, the process moves on to step S190, and the same brake pressure reduction control as in step S170 is performed. In other words, the wheels are in a low speed range in which the wheel speed VR* cannot be computed, but as the vehicle body speed is higher than the minimum calculable speed value Vm*, it is assumed that the wheel slip condition is in a state higher than the specified slip ratio. Thus, to avoid slipping of the wheel, the brake pressure is decreased.

If it is determined at step S145 that the wheel speed VR* is higher than the minimum calculable speed value Vm*, the process goes on to step S150. Here, the brake pressure is controlled according to the above mentioned anti-skid control.

Next, as shown in FIG. 5, the process, which notifies vehicular occupant when the minimum calculable speed value Vm* of a specific wheel exceeds the permissible speed Vmin more than a predetermined number of times, will be explained. If the minimum calculable speed value Vm* of a specific wheel exceeds the permissible speed Vmin more than a predetermined number of times, there may be a mechanical or electrical fault in the wheel speed sensor, or the installation of the wheel speed sensor may be loose, etc. It will be repeated as long as the vehicular occupant does not get rid of this factor. Thus, the following process is executed to notify the vehicular occupant or the necessity for servicing of replacement of repair.

First, the process from step S200 to S240 is executed to detect a timing that the vehicle changes from stopping state to traveling state. When the process is started, it is determined in step S200 if the current vehicle body speed VS is 0 km/h to detect whether the vehicle is stopping or not. If the current vehicle body speed VS is 0 km/h, the flag is set to 0 in step S210. If the current vehicle body speed VS is not 0 km/h, the process moves on to step S220. In step S220 it is determined whether the flag has been set to 0, and if it is determined that the flag is not set to 0, the process of this flow is completed. On the other hand, if it is determined that the flag is set to 0, it is estimated that the vehicle is stopping, and the process moves on to step S230. The process from steps S200 to S220 is for determining whether the vehicle has just started to travel from the stopping state.

In step S230, the vehicle body speed VS is compared with a specific value Kv1, and it is determined whether the wheel speed reaches a correctly computed speed after the vehicle starts traveling. If the vehicle body speed VS is lower than the specified value Kv1, it is determined that the vehicle has just started traveling from the stopping state and that the accurate wheel speed has not yet been computed based on the signal from the wheel speed sensor. If the vehicle body speed VS is higher than the specified value Kv1, the process moves on to step S240. The flag here is set to 1 to indicate that the vehicle has started traveling and that the wheel speed can be computed.

In step S250, the minimum calculable speed value Vm* and the permissible speed Vmin are compared, and if the minimum calculable speed value Vm* is lower than the permissible speed Vmin, it is assumed that the output from the wheel speed sensor is correct and that the wheel speed computation is correctly being executed. In this case, the process moves on to step S265 and a counter C1 is set to 0. If the minimum calculable speed value Vm* is higher than the permissible speed Vmin, the process moves on to step S260, and the counter C1 is incremented by one each time this process is performed.

At step S270, it is determined whether the counter value C1 is higher than the specified counter value KC1. If the counter value C1 is higher than the specified counter value KC1, the minimum calculable speed value Vm* for a specific wheel speed has exceeded the permissible speed VR* with a number of counter value KC1, the process moves on to step S280. At step S280, a warning is given to the vehicle occupant in order to notify the vehicle occupant of occurrence of a malfunction of, for instance, speed sensor.

Figure 6:
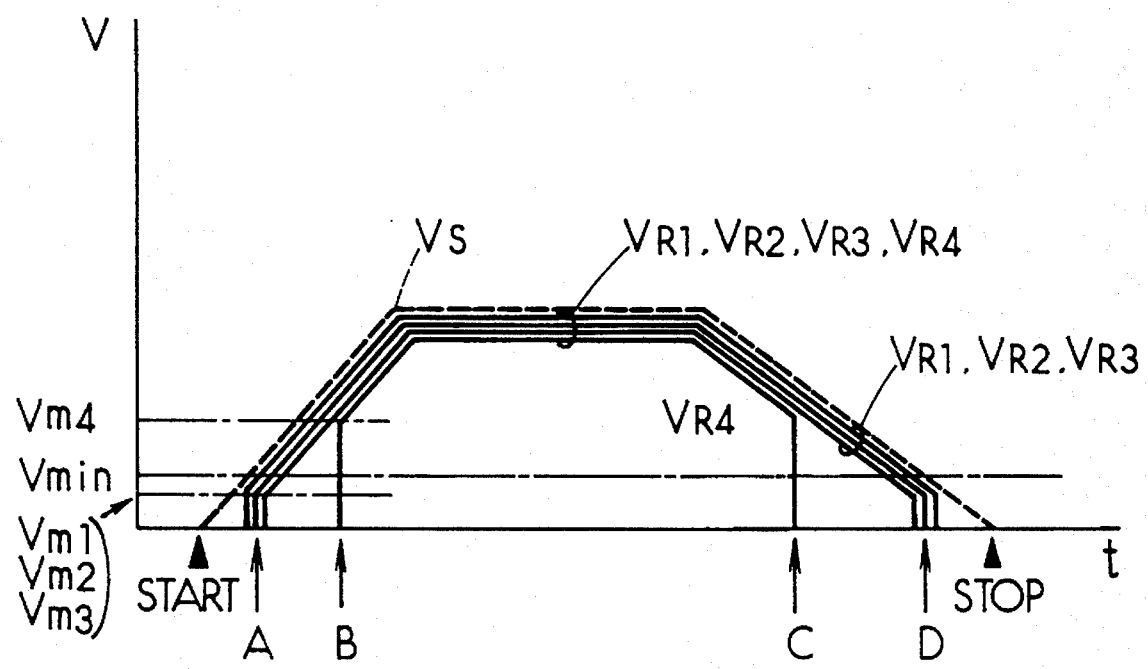
FIG. 6 is a timing chart illustrating the operation of the embodiment according to the present invention.

The operation of the embodiment explained above will be explained with reference to FIG. 6. In FIG. 6, the axis of ordinate indicates the speed (V), the axis of abscissas indicates the time (t). The state of actual changes in vehicle body speed and each wheel speed during traveling of the vehicle is shown.

When the vehicle starts to travel, the actual vehicle body speed changes as shown with the dotted line from the start point. Vm1, Vm2, Vm3 and Vm4 are the minimum calculable speed values computed from the signals detected by the wheel speed sensors 15, 16, 17 and 18 installed on each wheel. At this time, it is assumed that the minimum calculable speed values Vm1, Vm2, Vm3 are lower than the permissible speed Vmin and are detected at point A. It is also assumed that the minimum calculable speed value Vm4 is higher than the permissible speed Vmin and is detected at point B. The cause of this may be because when magnetic pickup type wheel speed sensor is used, the expansion between the pickup coil and the rotor occurs. The cause of the expansion is due to slack or looseness in the sensor installation or deformation of the sensor, etc.. In wheels where the minimum calculable speed values VM1, Vm2 and VM3 are correctly detected as explained above, the wheel speed is correctly computed until the vehicle body speed drops approximately below the permissible speed Vmin. However, in the wheel where the minimum calculable speed value is Vm4, it is the possibility that wheel speed computation will not be possible at point C. When the anti-skid control is performed with the condition that the vehicle body speed is higher than the permissible speed Vmin, if the wheel speed VR4 at point C is computed as 0 km/h, it will be determined that the difference between vehicle body speed VS and wheel speed VR4 is extremely large. In other words, at this wheel, it will be determined that the slip ratio at point C for this wheel is excessive. Therefore, even if the brake pressure is increased or unchanged depending on the anti-skid control, the brake pressure will be reduced. The braking force of the vehicle may be insufficient due to such an undesired operation of the anti-skid control. If the brake pressure is not being controlled based on anti-skid control, it is determined that the slip ratio is excessive, the reduction of the brake pressure will start. Thus, the driver may feel an unpleasantness due to pedal shock or motor rotation for hydraulic control unit when the reduction of the brake pressure starts.

However, by changing the permissible speed Vmin for the wheel having the minimum calculable speed value Vm4 to the minimum calculable speed value Vm4, it is not determined that the slip ratio is excessive at point C. The reduction of the brake pressure will not be executed in spite of whether or not anti-skid control is being executed. Thus, the above problem is resolved, and the brake pressure control can be executed accurately.

If the minimum calculable speed value Vm* exceeds the permissible speed Vmin the specified number of predetermined times, the vehicular occupant can recognize the abnormalities in the wheel speed sensor, by notifying it to the vehicular occupant. Thus, the vehicular occupant can take measures such as replacing the wheel speed sensor, and a further accurate vehicle control can be realized.

The present invention is not limited to the embodiments, but can be changed in various ways as explained below.

For example, in the embodiment, it is explained with reference to the case which the present invention is applied to the brake pressure control (the anti-skid control). However, the control to which the present invention can be applied is not limited to the brake pressure control. It can be widely applied to the control such as 4WS and suspension control in which the control is performed based on output signals from the wheel speed sensor. Of course, the present invention can also be applied to traction control TRC in which brake pressure is controlled. In this case, the permissible speed Vmin is used as the permission reference for traction control in the same way as explained in the embodiment. Undesired operation of the brake pressure control depending on the traction control can be avoided by comparing the permissible speed Vmin and minimum calculable speed value Vm* and changing the traction control permission reference as in the embodiment. In this case, the minimum calculable speed value Vm* computed immediately before the vehicle stopping can be stored and used as the minimum calculable speed value Vm* when the vehicle starts the next time. The traction control to which is applied the present invention can control the drive force accurately.

In the embodiment, the previous calculated minimum calculable speed value VM* was reset when the vehicle stopped. However, it is predicted that most errors in the minimum calculable speed value Vm* will occur due to mechanical faults in the wheel speed sensor. Thus, as long as the vehicular occupant does not fix the wheel speed sensor, the minimum calculable speed value Vm* continuously exceed the permissible value Vmin. By using the previously computed minimum calculable speed value Vm* the specified number of times, the number of computation processes of ECU 27 can be reduced and the response can be improved.

In the embodiment, a magnetic pickup type wheel speed sensor was installed on the wheel. However, the sensor that can be used is not limited to the one installed the wheel. For example, a wheel speed sensor installed on the speedometer cable retrieval port on the transmission can also be used.

When the minimum calculable speed value Vm* according to the embodiment is computed, a high wheel speed may be computed as the minimum calculable speed value Vm* regardless of faults in the wheel speed sensor because of sudden starting of the vehicle or starting while slipping on a low friction coefficient road. To avoid this, for example if the minimum calculable speed value Vm* for three wheels were computed as wheel speeds near 1 km/h and the minimum calculable speed value Vm* for the remaining wheel was computed as 4 km/h almost simultaneously due to slipping of the wheel, the average of the accurate minimum calculable speed values Vm* for the three wheels can be used as the minimum calculable speed value Vm* for the remaining wheel.

Furthermore, in the embodiment, the permissible speed Vmin for each wheel was changed to the minimum calculable speed value Vm* based on the comparison of each wheel's minimum calculable speed value Vm* and the permissible speed Vmin. However, the permissible speed Vmin for all wheels can be changed to the minimum calculable speed value Vm* for the wheel when at least one of the wheel's minimum calculable speed value Vm* exceeds the permissible speed Vmin. In this case, there will be no inconsistency to the control for each wheel, and a further stable vehicle control can be executed.

What is claimed is:

1. A vehicle control unit for controlling a specific control target on a vehicle based on a wheel speed comprising:

signal outputting means for outputting a frequency signal corresponding to a wheel rotating speed;

wheel speed calculation means for calculating a wheel speed on the basis of the frequency signal output by the signal outputting means;

memory means for storing as a minimum calculable wheel speed a minimum value among the wheel speeds calculated by the wheel speed calculation means;

comparing means for comparing the minimum wheel speed with the wheel speeds calculated by the wheel speed calculation means; and vehicle control changing means for changing a content of control toward the specific control target depending on the result of the comparison executed by the comparing means.

2. A vehicle control unit for controlling a specific target on a vehicle as claimed in claim 1, wherein the minimum wheel speed is the first wheel speed calculated after the vehicle starts traveling.

3. A vehicle control unit for controlling a specific target on a vehicle as claimed in claim 1, wherein the minimum wheel speed is based on a plurality of wheel speeds calculated just after the vehicle starts traveling.

4. A vehicle control unit for controlling a specific control target on a vehicle as claimed in claim 1, wherein the vehicle control changing means executes restricted content of control toward the specific control target.

5. A vehicle control unit for controlling a specific control target on a vehicle as claimed in claim 1, further comprising:

warning means for estimating a malfunction in at least one of the signal outputting means and wheel speed calculation means when the vehicle control changing means has changed the content of control more than a predetermined number of times and for giving a warning of the malfunction to a vehicular occupant.

6. A vehicle control unit for controlling a specific control target on a vehicle based on wheel speed comprising:

signal outputting means for outputting a frequency signal corresponding to a wheel rotating speed;

wheel speed calculation means for calculating a wheel speed on the basis of the frequency signal output by the signal outputting means;

memory means for determining and storing a minimum wheel speed from the wheel speed calculated by the wheel speed calculation means;

selecting means for comparing the minimum wheel speed with a predetermined speed value, and selecting the larger one of the minimum wheel speed and the predetermined speed value; and vehicle control changing means for comparing the selected speed with the wheel speed calculated by the speed calculation means, and changing a content of control toward the specific control target depending on whether the calculated wheel speed is higher than the selected speed or not.

7. A vehicle control unit for controlling a specific control target on a vehicle as claimed in claim 6, wherein the minimum wheel speed is the first wheel speed calculated after the vehicle starts traveling.

8. A vehicle control unit for controlling a specific control target on a vehicle as claimed in claim 6, wherein the minimum wheel speed is base on a plurality of wheel speeds calculated just after the vehicle starts traveling.

9. A vehicle control unit for controlling a specific control target on a vehicle as claimed in claim 6, wherein the vehicle control changing means executes restricted content of control toward the specific control target.

10. A vehicle control unit for controlling a specific control target on a vehicle as claimed in claim 6, further comprising:

warning means for giving a warning to a vehicular occupant, when the selecting means has selected the minimum wheel speed more than a predetermined number of times.

11. A vehicle control unit for controlling a specific control target on a vehicle based on a wheel speed and a vehicle body speed comprising:

signal outputting means for outputting a frequency signal corresponding to a wheel rotating speed;

wheel speed calculation means for calculating a wheel speed on the basis of the frequency signal output by the signal outputting means;

vehicle body speed calculation means for calculating a vehicle body speed corresponding to a running speed of the vehicle;

memory means for determining and storing a minimum wheel speed from the wheel speed calculated by the wheel speed calculation means;

selecting means for comparing the minimum wheel speed with a predetermined speed value, and selecting the larger one of the minimum wheel speed and the predetermined speed value; and vehicle control stop means for comparing the selected speed with the vehicle body speed calculated by the vehicle body speed calculation means, and stopping controlling the specific control target if the vehicle body speed is lower than the selected speed.

12. A vehicle control unit for controlling a specific control target on a vehicle as claimed in claim 11, wherein the minimum wheel speed is the first wheel speed calculated after the vehicle starts traveling.

13. A vehicle control unit for controlling a specific control target on a vehicle as claimed in claim 11, wherein the minimum wheel speed is based on a plurality of wheel speeds calculated just after the vehicle starts traveling.

14. A vehicle control unit for controlling a specific control target on a vehicle as claimed in claim 11, further comprising:

warning means for giving a warning to a vehicular occupant, when the selecting means has selected the minimum wheel speed more than a predetermined number of times.

15. A vehicle control unit for controlling a brake pressure of a wheel on a vehicle based on a wheel speed and a vehicle body speed comprising:

signal outputting means for outputting a frequency signal corresponding to a wheel rotating speed;

wheel speed calculation means for calculating a wheel speed on the basis of the frequency signal output by the signal outputting means;

vehicle body speed calculation means for calculating a vehicle body speed corresponding to a running speed of the vehicle;

memory means for determining and storing a minimum wheel speed from the wheel speed calculated by the wheel speed calculation means;

selecting means for comparing the minimum wheel speed with a predetermined speed value, and selecting the larger one of the minimum wheel speed and the predetermined speed value; and pressure control means for comparing the selected speed with both the wheel speed and the vehicle body speed, and reducing the brake pressure when the vehicle body speed is higher than the selected speed and the wheel speed is lower than the selected speed and increasing the brake pressure when the vehicle body speed is lower than the selected speed.

16. A vehicle control unit for controlling a brake pressure of a wheel on a vehicle as claimed in claim 15, wherein the minimum wheel speed is the first wheel speed calculated after the vehicle starts traveling.

17. A vehicle control unit for controlling a brake pressure of a wheel on a vehicle as claimed in claim 15, wherein the minimum wheel speed is based on a plurality of wheel speeds calculated just after the vehicle starts traveling.

18. A vehicle control unit for controlling a brake pressure of a wheel on a vehicle as claimed in claim 15, further comprising:

warning means for giving a warning to a vehicular occupant, when the selecting means has selected the minimum wheel speed more than a predetermined number of times.

* * * * *